April 21, 1953 C. A. NICHOLS ET AL 2,635,876
STACK ELEVATOR FOR ASSEMBLING APPARATUS
Original Filed May 31, 1946 6 Sheets-Sheet 4

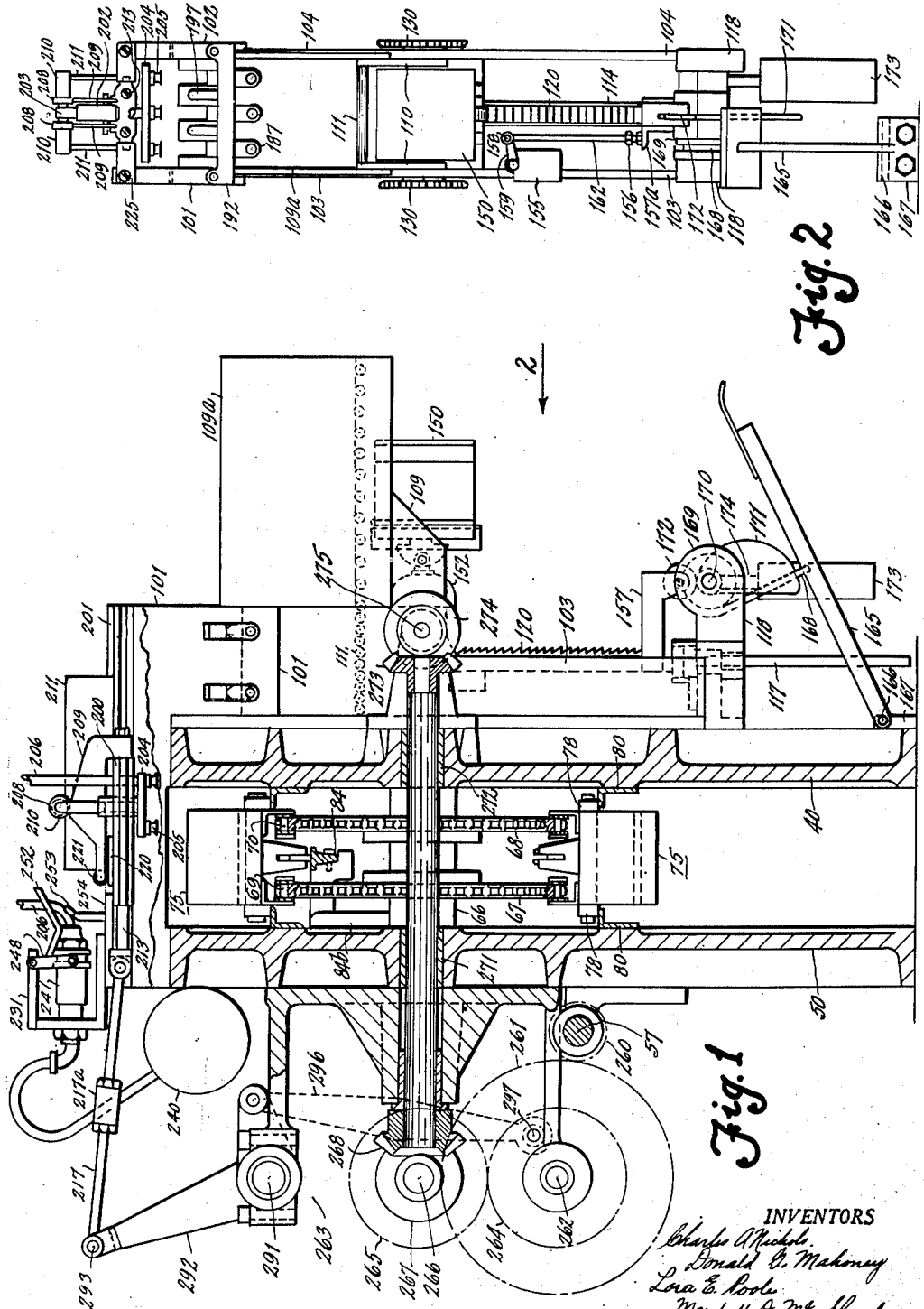

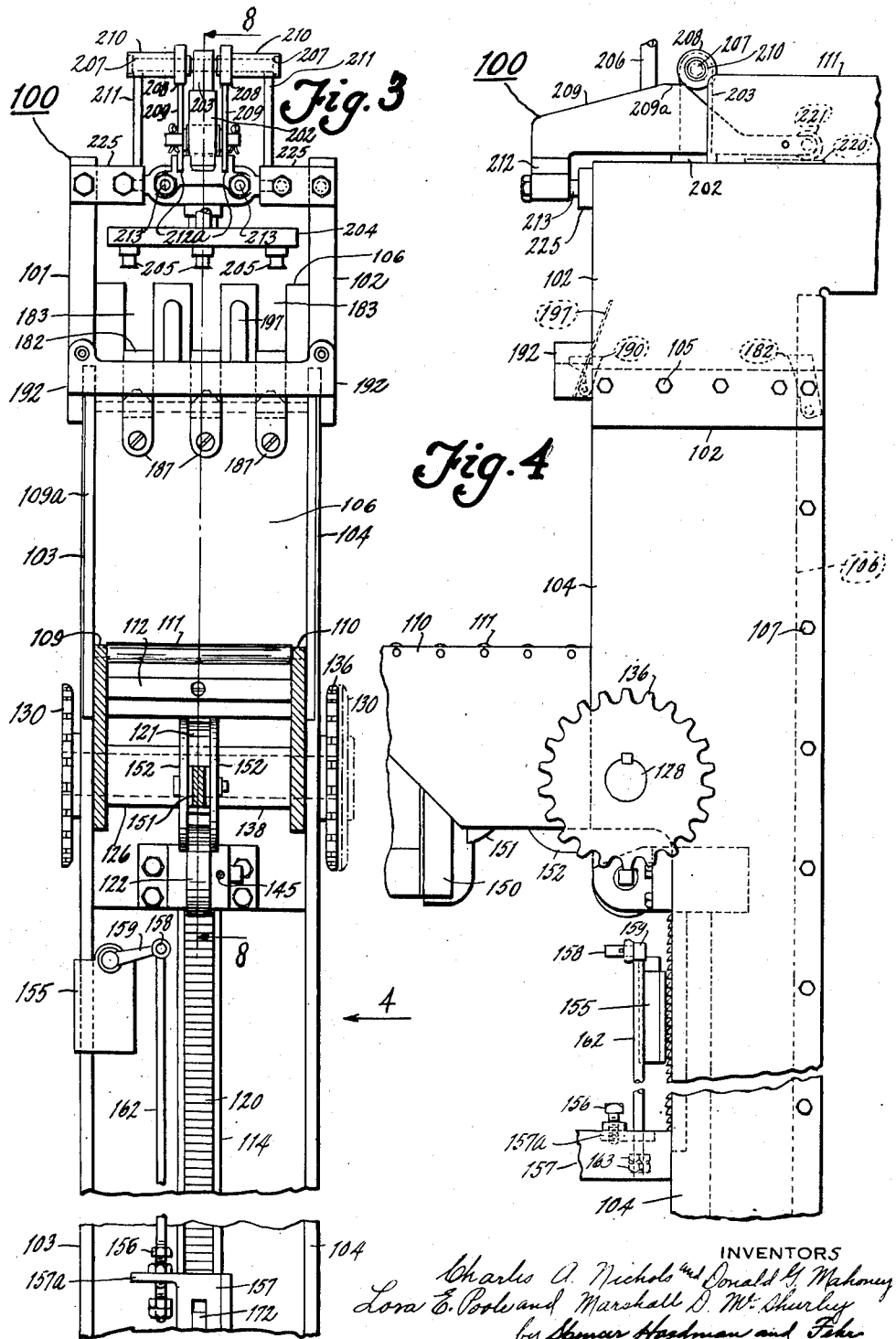

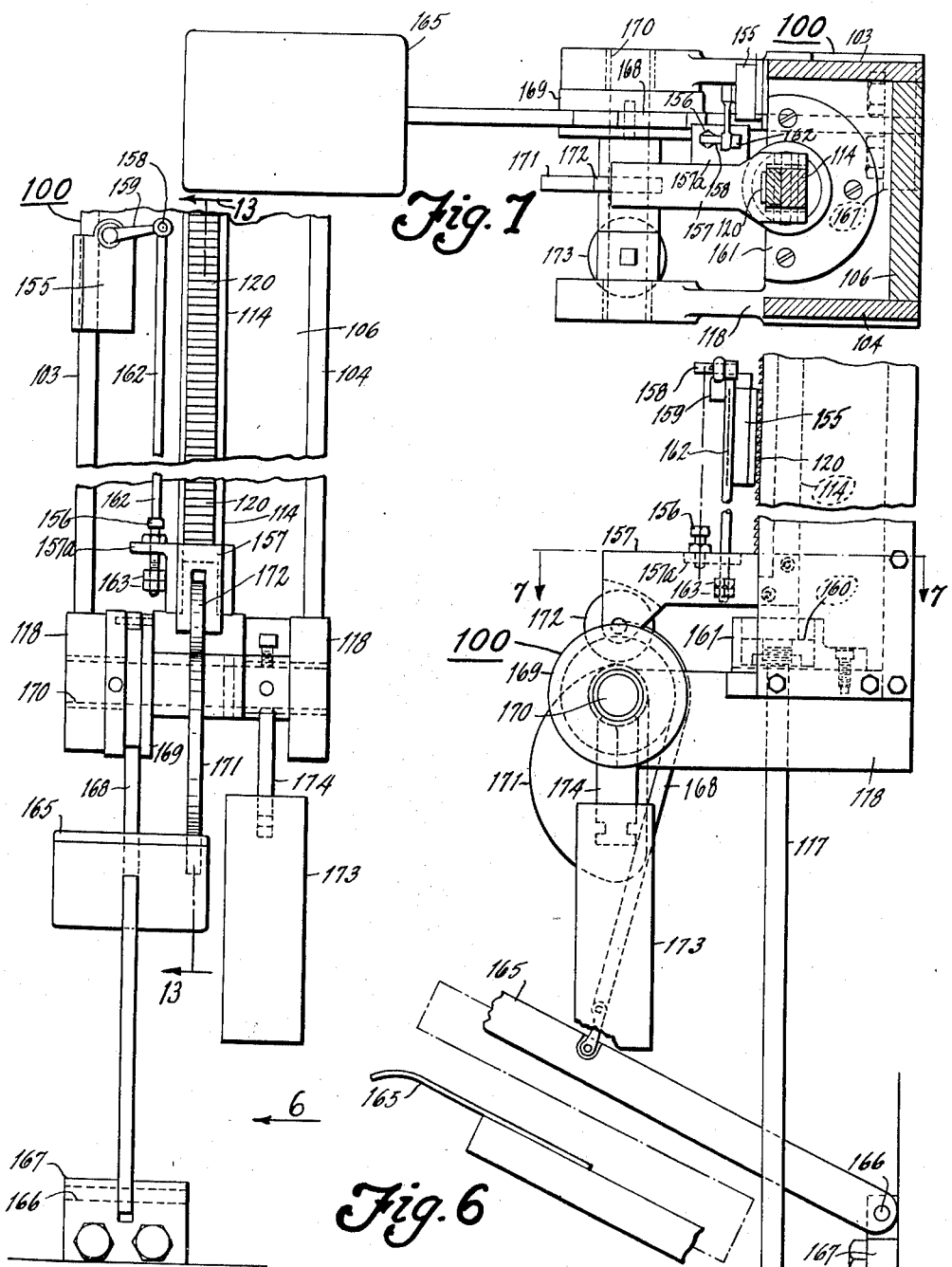

Inventors
Lora E. Poole
Charles A. Nichols
Donald G. Mahoney
Marshall D. McSherley
by Spencer Hardman & Fehr
their ATTORNEYS April 21, 1953

C. A. NICHOLS ET AL 2,635,876

STACK ELEVATOR FOR ASSEMBLING APPARATUS

Original Filed May 31, 1946

April 21, 1953 C. A. NICHOLS ET AL 2,635,876
STACK ELEVATOR FOR ASSEMBLING APPARATUS
Original Filed May 31, 1946 6 Sheets-Sheet 6

Patented Apr. 21, 1953

2,635,876

UNITED STATES PATENT OFFICE 2,635,876

STACK ELEVATOR FOR ASSEMBLING APPARATUS

Charles A. Nichols and Lora E. Poole, Anderson, and Donald G. Mahoney and Marshall D. McShurley, Muncie, Ind., assignors to General Motors Corporation, Detroit, Mich., a corporation of Delaware Original application May 31, 1946, Serial No. 673,574. Divided and this application August 28, 1948, Serial No. 46,654

7 Claims. (Cl. 271—62)

This invention relates to machinery for stacking a plurality of different flat parts in predetermined sequence. The machine disclosed herein is particularly adapted for stacking plates and separators for storage batteries.

This application is a division of application Serial No. 673,574, filed May 31, 1946, now Patent No. 2,568,248, granted September 18, 1951. An object of the invention disclosed in said application is to provide a machine comprising a conveyor having a plurality of holders, each for receiving the required number of parts, a plurality of magazines, each receiving a pile of parts to be stacked, the number of magazines equalling the total number of parts to be stacked in each holder of the conveyor, and means operating in timed relation with the conveyor for transferring the parts, one at a time, from the magazines to the holders while the conveyor continues its movement.

More particularly, it is an object to provide a transfer mechanism associated with each magazine and having vacuum cups which are lowered upon the uppermost part of each magazine stack and which become attached to the uppermost part by suction applied to the cups, the cups being lifted with a part attached thereto and then shifted laterally into vertical alignment with a conveyor holder, the vacuum then being broken so that the part descends from the cups to the holder. In connection with the foregoing it is a further object to provide for gradually lowering the holders as the conveyor moves so that the distances which the parts descend from the vacuum cups will be substantially the same.

An object of the invention claimed in this application is to provide each magazine with means for automatically lifting its stack of parts so that the uppermost part remaining in the stack will be positioned for engagement by the suction cups when they descend upon it. This object is accomplished by the provision of a vertically movable platform actuated upwardly by mechanism having step-by-step motion and operated in timed relation with the conveyor.

A further object is to provide for reloading each magazine before all of the parts therein have been transferred to conveyor holders. This object is accomplished by providing for the descent of the platform while leaving within the reach of the vacuum cups a plurality of parts to be engaged thereby while additional parts are being placed upon the platform. Manually operable means are provided for elevating the platform so that the uppermost one of the reloaded parts engages or is in close proximity to the lowermost part held in reserve during the reloading operation.

A further object is to provide a machine of the character described, which is adapted for stacking different numbers of parts in the holders of the conveyor. In this connection, it is an object to provide for the construction of each magazine and its associated transfer mechanism as a unitary structure. To the conveyor frame there are secured a number of these units equalling the number of parts to be stacked in each conveyor holder. In this connection, it is an object to provide a magazine and transfer unit of such construction that any one of the units can be removed from the machine without disturbing any of the other units.

Further objects and advantages of the present invention will be apparent from the following description, reference being had to the accompanying drawings, wherein preferred embodiments of the present invention are clearly shown.

In the drawings:

Fig. 1 is a sectional view of a machine equipped with magazines and transfer mechanisms which are shown in side elevation.

Fig. 2 is a view in the direction of arrow 2 of Fig. 1 showing a front elevation of one of the magazines.

Figs. 3 and 4 are, respectively, front and side elevations of the upper portions of one of the magazine-transfer units. That portion of Fig. 3 in section is on line 3—3 of Fig. 8.

Figs. 5 and 6 are, respectively, front and side elevations of the lower portion of a magazine-transfer unit.

Fig. 7 is a view on the line 7—7 of Fig. 6.

The conveyor

Figure 9:
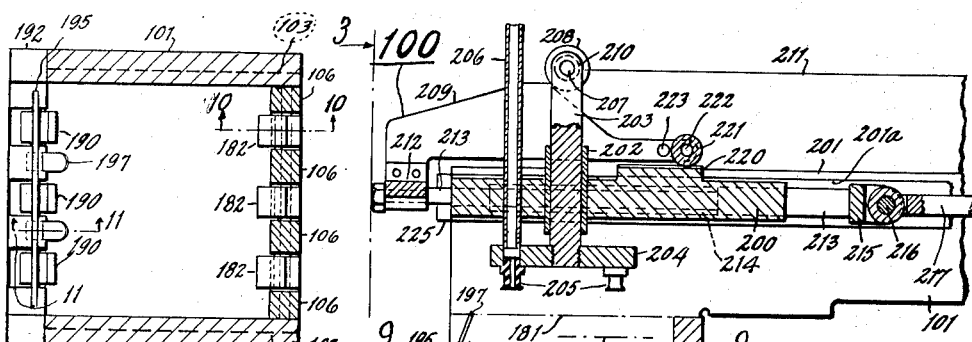
Fig. 9 is a sectional view on line 9—9 of Fig. 8.

The supporting structure of the conveyor comprises chiefly a front frame 49 and a rear frame 50 (Fig. 1). An electric motor drives a shaft 57 connected by suitable gearing with a plurality of shafts each connected with two hubs 66 of sprockets 67 and 68 which engage conveyor chains 69 and 70 respectively, which are attached to a plurality of equidistant workholders 75 which receive the plates and separators transferred from magazines by a transfer mechanism which drops them upon the workholders when the workholders are located so as to receive them. The spacing of the workholders is the same as the spacing of the magazines and transfer mechanisms. As the workholders pass under the transfer mechanisms each receives the same number of plates and separators equal in number to the requirements of one cell of a storage battery. After the workholders pass from the end of the line of magazines and transfer mechanisms, they are unloaded and they pass empty below the sprockets and then up to the beginning of the line.

Magazine-transfer unit

Figure 12:
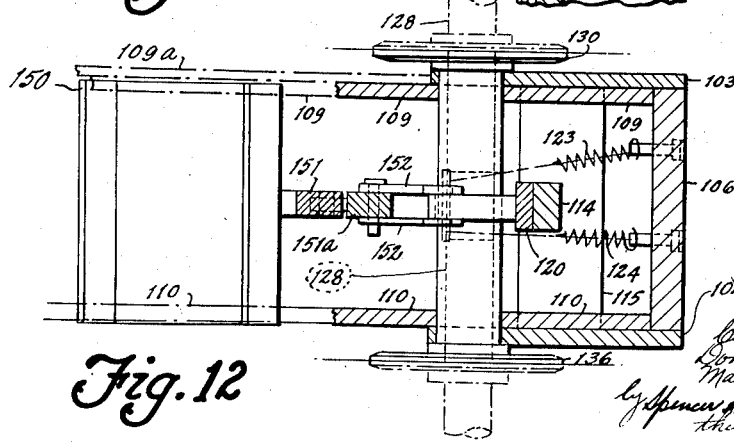
Fig. 12 is a sectional view on line 12—12 of Fig. 8.
Figure 13:
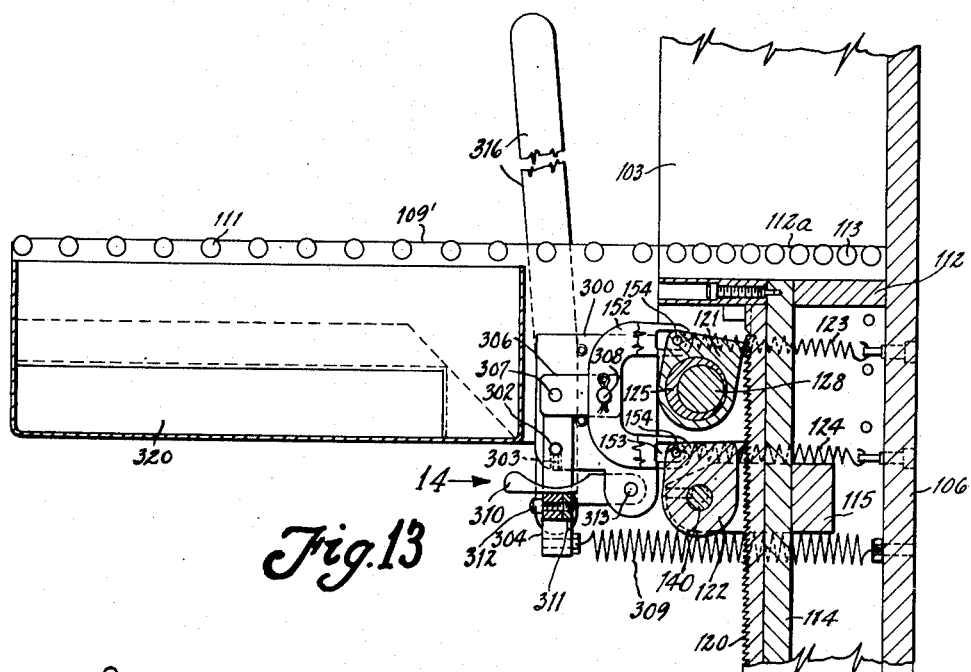
Fig. 13 is a vertical, longitudinal sectional view of a magazine unit provided with a modified form of control for the parts elevating platform.
Figure 19:
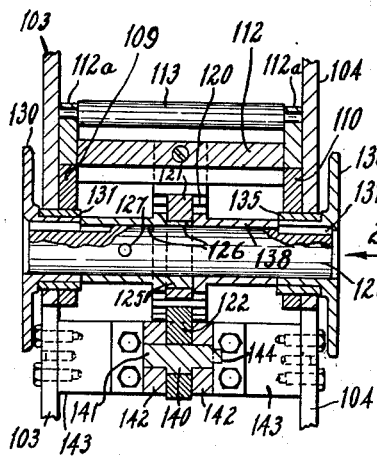
Fig. 19 is a sectional view on line 19—19 of Fig. 8.

The frame of the magazine-transfer unit 100 comprises, as shown in Figs. 1, 3 and 4, a pair of horizontally extending side plates 101 and 102 attached by screws 105 to a pair of vertically extending side plates 103 and 104, respectively. As shown in Fig. 1, the side plates 101 and 102 are mounted upon the conveyor side frame such as sections 49 and 50, for example. The vertical side plates 103 and 104 are attached to a back plate 106 which is secured to the front-side frames of the conveyor, such as the section 49 of Fig. 1. Screws 107 secure plates 103 and 104 to the back plate 106. The plates 103 and 104 support a pair of plates 109 and 110, respectively (Fig. 3), which support a series of rollers 111 upon which a stack of parts may be placed preparatory to movement thereof upon the rollers 113 of magazine platform 112 (Fig. 13). Rollers 113 are journaled in bearings provided by plate 112a attached to platform 112 which as shown in Fig. 19 is supported by plates 109 and 110 when the platform is in loading position. The platform 112 is movable vertically in the channel-space enclosed between plates 103, 104 and 106, from a lower level in which the rollers 113 are on the level of the rollers 111 to an upper level at which the parts (storage battery plates or separators) are supported for engagement by vacuum cups of the transfer mechanism to be described. In order to provide for upward movement of the platform 112, there is supported a rod 114 guided by a bracket 115 which is supported between the plates 103 and 104 and guided also by bearing 116 which receives a rod 117 attached to the rod 114. Bearing 116 is mounted in a bracket 118 attached to the plates 103 and 104. The rod 117 is cylindrical. The rod 114, as shown in Fig. 12, is rectangular and received by the notch in the bracket 115. Hence, turning of the rod 114 is prevented.

Rod 114 is lifted by a mechanism having a step-by-step motion. For this purpose, the rod 114 carries a ratchet bar 120 engaged by an elevating pawl 121 and a retaining pawl 122. These pawls are urged by springs 123 and 124 against the ratchet bar 120. Pawl 121 (Fig. 19) is supported by an eccentric 125 provided by a sleeve 126 attached by pin 127 to a shaft 128 to which a key 129 secures a sprocket 130 whose hub is journaled in a bearing 131 supported by plate 103 and plate 109. Side plate 104 and plate 110 support a bearing 135 within which is journaled the hub of a sprocket 136 attached by key 137 to shaft 128. The pawl 121 is retained upon its eccentric 125 by a spacing sleeve 138 located between the hub of sprocket 136 and the right side of the eccentric 125. When the shaft 128 is rotated, the pawl 121 is lifted a distance slightly in excess of the spacing of the teeth of the ratchet bar 120 so that the retaining pawl 122 may move under a tooth of the ratchet bar and retain the bar while the pawl 121 descends in order to pick up the next succeeding ratchet tooth. By means to be described, the shaft 128 is continuously rotated. Retaining pawl 122 is mounted on the eccentric portion 140 of a shaft 141 supported by brackets 142 attached to a bar 143 supported between the plates 103 and 104. The shaft 141 has a square end portion 144 for receiving a wrench by which the shaft 141 may be turned in order to adjust the location of the retaining pawl 122. When the pawl 122 has been located properly, the shaft 141 is locked in the desired position of adjustment by a set screw 145.

By virtue of the reciprocating motion of the pawl 121, the platform 112 is caused to move upwardly until a predetermined elevation is reached when the pawls 121 and 122 are automatically retracted and the platform 112 gravitates to loading position shown in Fig. 2. The retraction of the pawls, by causing them to move counterclockwise (Fig. 8) about their supports, is effected by an electromagnet or solenoid 150 supported between the plates 109 and 110 and having an armature 151 connected by a link 151a with two yoke plates 152 which are provided with slots 153 (Fig. 8) each receiving a pin 154 with which a spring 123 or 124 is connected. The slots 153 permit counterclockwise movement of the ratchets 121 and 122 during their normal function. When the armature 151 moves right in Fig. 1 or left in Fig. 8, the yoke plates 152 move the pins 154 away from the ratchet bar 120 so that the platform 112 is free to gravitate. The solenoid is controlled by an electric switch 155 mounted on side plates 103, Figs. 3 and 5. When platform 112 is moved upwardly a certain distance, an adjustable screw 156 (Fig. 4) mounted on a bracket 157 attached to bar 114 engages a stud 158 carried by the operating arm 159 of the switch 155 and causes the arm to move counterclockwise as viewed in Figs. 3 and 5 to connect the solenoid 150 with a current source, not shown. The pawls 121 and 122 are retracted from the ratchet bar 120 so that the platform 112 is free to descend. Its descent is cushioned by the engagement of a piston 160 (Fig. 6) on rod 117 with a cylinder 161 mounted on bracket 118.

The return of the platform 112 to loading position effects automatically the opening of the switch 155 so that the pawls 121 and 122 are returned by the springs 123 and 124 to operating position. For this purpose, the stud 158 of the switch lever 159 is connected with a rod 162 whose lower end passes through a hole in a lug 157a of bracket 157. The lower end of rod 162 is threaded to receive nuts 163 which are so adjusted that the descent of the bracket 157 causes its lug 157a to engage the upper nut 163 to move the rod 162 down and the arm 159 clockwise into position for opening the switch 155.

Figures 8, 11:
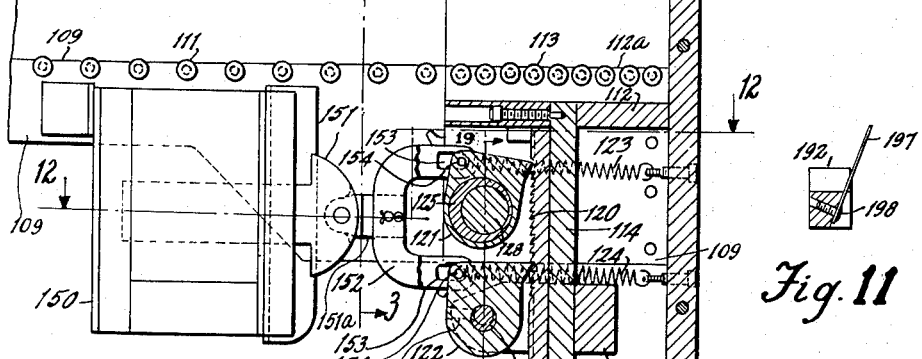
Fig. 8 is a fragmentary, sectional view on line 8—8 of Fig. 3.
Fig. 11 is a sectional view on line 11—11 of Fig. 9.

Immediately following the descent of the platform 112, the operator moves a stack of parts (which may be aligned by a plate 109a extending above plate 109, Figs. 3 and 8) from the rollers 111 upon the rollers 113 carried by the platform 112. It is then necessary to move the platform to a starting position so that the uppermost part of the stack of parts will be in close proximity to the lowermost part of a group of parts being retained in the upper end of the magazine by means to be described. To effect this, the operator depresses a pedal lever 165 pivoted at 166 on a bracket 167 attached to a member of the front frame of the conveyor. Motion is transmitted by a chain 168 attached to the lever 165 to a wheel 169 fixed to a shaft 170 supported by the bracket 118. The shaft 170 is rotated counterclockwise in Fig. 1 or clockwise in Fig. 6 to cause the cam 171 to engage a roller 172 pivotally supported by bracket 157 and thus to lift the bracket 157 and the rod 114 and the platform 112 to the starting position. The pawl 122 will retain platform 112 approximately at position into which it is elevated by the operator. Then the operator releases the pedal 165 and the shaft 170 and parts carried thereby are returned to their original position by counterweight 173 connected with a rod 174 attached to the shaft 170. Thus the lever 165 is returned to its original position. The upward feeding of the magazine platform 112 from starting position continues by virtue of the reciprocation of the pawl 121 which is effected by the rotating shaft 128.

Figure 10:
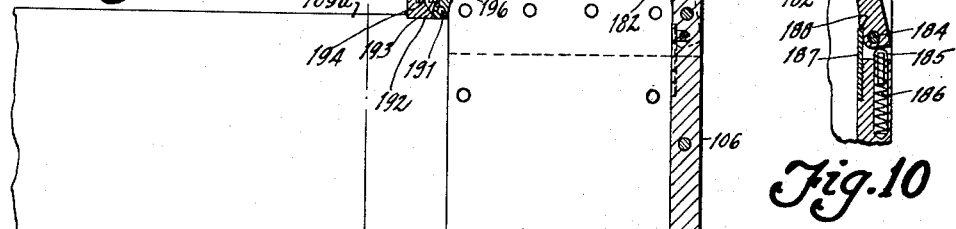
Fig. 10 is a sectional view on line 10—10 of Fig. 9.
Figure 15:
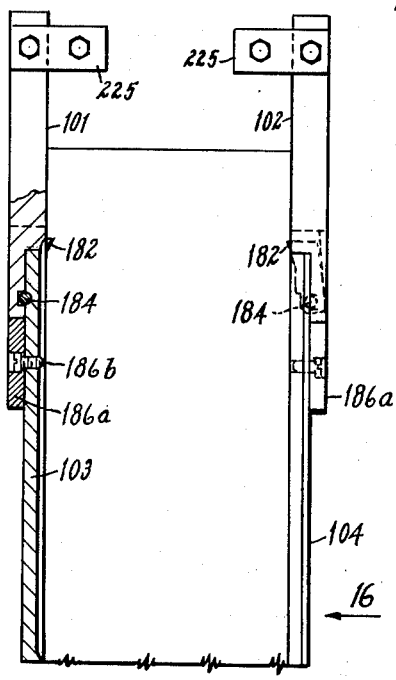
Figs. 15 and 16 are fragmentary, front and side views, respectively, of a magazine when adapted for receiving battery plates, the magazine shown in Figs. 3, 4, 8, 9, 10 and 11 being adapted for receiving battery plate separators.
Figures 16, 17, 18:
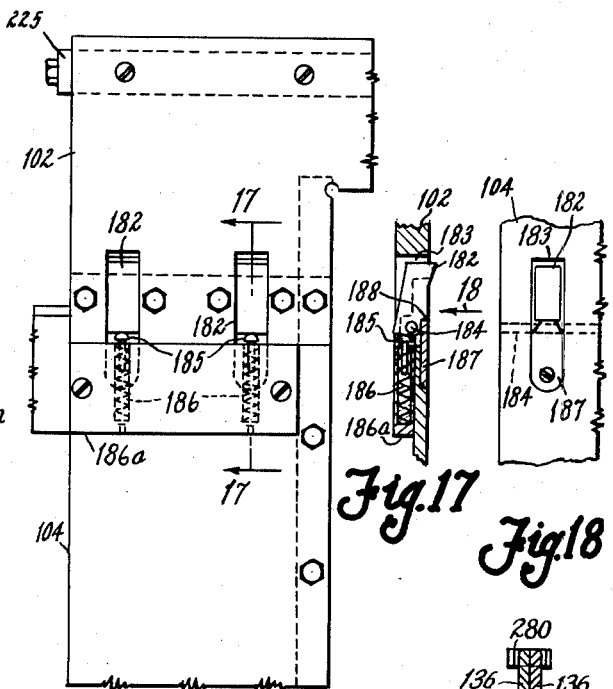
Fig. 17 is a fragmentary, sectional view on line 17—17 of Fig. 16.
Fig. 18 is a fragmentary view in the direction of arrow 18 of Fig. 17.
Figure 23:
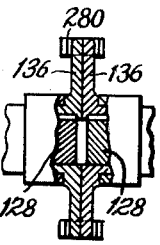
Fig. 23 is a fragmentary, sectional view showing attachment of adjacent juxtaposed sprockets through the chain band.

At the instant the platform 112 is released and descends to its loading position, the top edges of the rollers 113 will have been elevated slightly above a level represented by dot-dash line 180, Fig. 8, which represents the elevation of the underside of the lowermost stack of parts remaining in the magazine. The level of the upper surface of the uppermost part is represented by line 181. Therefore the reserve stack of parts is located between the levels 180 and 181. The reserve stack is retained by pawls which move into retaining position at the beginning of the descent of the platform 112 when released. If the magazine is to contain storage battery plates, it is provided with pawls 182 (Fig. 15) which move into position for engagement with the lower surface of the lowermost plate in the reserve stack. Pawls 182 are located in recesses 183 provided by the side plates 103 and 104. Each is pivoted upon a rod 184 and is urged into retaining position by a plunger 185 actuated by a spring 186 (Fig. 17). Counterclockwise movement of the pawl 182 is limited by a stop plate 187 engaging a shoulder 188 of the pawl. Plates 186a attached to the side plates 103 and 104 by screws 186b (Fig. 15), support the springs 186 and plungers 185. Rods 184 are confined in grooves provided by plates 101 and 103 on the left (Fig. 15) and provided by plates 102 and 104 on the right. If the magazine is to contain storage battery separators, the means for retaining the reserve stack is effected by a set of pawls 182 (Fig. 9) like pawls 182 of Fig. 17 supported by the back plate 106 and by a set of pawls 190 supported by rod 191 carried by a bar 192 which is attached to side plates 101 and 102. The pawls 190 are urged clockwise in Fig. 8 by plungers 193 actuated by springs 194. Clockwise movement of each pawl 190 is limited by a bar 195 received by a notch 196 in the pawl. Bar 195 is attached to bar 192. Separators are urged toward back plate 106 by spring fingers 197 attached by screws 198 to bar 192 (shown in Fig. 10).

*Transfer mechanism*

The transfer mechanism, as shown in Figs. 1, 2, 3, 4 and 8, comprises a plate or carriage 200 (Fig. 8) which is reciprocated horizontally by mechanism to be described. For this horizontal movement, it is guided and supported by guide plates 201 (Fig. 1) having grooves and attached to sides plates 101 and 102. Plate 200 provides a tubular bearing 202 (Fig. 8) receiving a rod 203 supporting a plate 204 carrying a plurality of vacuum cups 205 connected by suitably passages with a pipe 206 extending from the plate 204 and slidable through an opening in the plate 200. The pipe 206 is attached by a hose or flexible tube to a vacuum controlling valve to be described. The rod 203 carries a shaft 207 which extends horizontally and which supports rollers 208 for engaging cam plates 209 and rollers 210 for engaging rails 211. The rails 211 are supported by the guide plates 201. Cam plates 209 are attached by yoke 212 to rods 213 which pass through holes 214 in plate 200 so that the cam plates 209 may be guided for horizontal movement relative to the plate 200. Rods 213 are connected with a yoke 215 which is pivotally connected by a pin 216 with a link 217 connected with a reciprocating mechanism to be described. Guidance of the plates 209 for horizontal movement relative to the plate 200 is effected also by the engagement of a pad 220 (Figs. 1 and 4) of plate 200 with roller 221 pivotally supported by the plates 209. The spacing of the plates 209 is determined by notches 212a provided by the yoke 212 for the reception of the plates and also by a spacer stud 223 joining the plates. As the rods 213 move toward the front of the machine (right in Fig. 1 and left in Fig. 8), the plate 200 tends to move with the rods 213 due to the compression of the air being trapped within the holes 214 in plate 200. Movement of plate 200 toward the left is arrested by engagement with stops 225 fastened to the ends of the side plates 101 and 102 and guide-bars 201. As movement of the rods 213 continues, the rollers 210 leave the rails 211 and rollers 208 engage the cam plates 209. As plates 209 move left, the rollers 208 will descend along the plates 209; and the vacuum cups 205, which are suspended thereby, will descend to the level indicated by line 205a in Fig. 21 or to whatever higher level is attained by the uppermost surface of the parts in the upper end of the magazine. The pipe 206 being connected with vacuum, the uppermost part in the magazine will adhere to the cups 205 as the cups ascend. Movement of the rods 213 toward the right causes cams 209 to move relative to the rollers 208, thereby lifting the rollers 208 while rollers 210 ride along the vertical end edges of the rails 211. By the time that the lost motion between the yoke 212 and the left end of the plate 200 has been taken up, the rollers 208 will rest upon the horizontal surfaces 209a (Fig. 4) of the cam plates 209. Further, right movement of the rods causes the plates 209 and the plate 200 to move together. At the start of this movement, the rollers 210 ride over the rounded corners of the rails 211 and then upon the rails. As the transfer mechanism travels toward the conveyor, the rollers 210 ride along the rails 211, thereby supporting the part adhering to the vacuum cups above the upper sides of the conveyor side frames. By the time the axes of the rollers 210 have been brought into alignment with the vertical center line of the conveyor so that the part transferred may gravitate upon the platform 81 of the conveyor receptacle 75, a valve will have been actuated to relieve the vacuum upon the cup.

The vacuum controlling valve will now be described, with reference to Fig. 1. The valve unit 230 comprises a frame 231 mounted on one of the plates 201. The valve has a movable sleeve 241 which in the position shown causes a pipe 239 connected with a vacuum manifold to be connected with a pipe 206 connected with vacuum cups. The vacuum manifold 240 is connected with a vacuum pump and has a capacity such that it can supply needed vacuum to the cups in as many sets of transfer units as are required for the stacking operations. When the valve 241 is in the position shown in Fig. 1, the vacuum cups are subjected to vacuum so that the uppermost part of the stack in the magazine will be transferred first upwardly and then horizontally toward the conveyor. As the part approaches the conveyor, the lug 253 attached to carriage plate 200 rides under the rod 252 and strikes an arm 248, thereby causing it to move left in Fig. 1. By the time the rod 203 has been positioned in vertical alignment with the center line of the conveyor, the valve 241 will have been moved into a position such that the vacuum is cut off and the cups are vented, thereby permitting the part to gravitate upon the workholder 75. During movement of the plate 200 toward the magazine, the lug 253 engages the rod 252 and returns the valve 241 to the position shown in Fig. 1 so that vacuum is again applied to the cups.

*Magazine-transfer unit operating mechanism*

Figure 20:
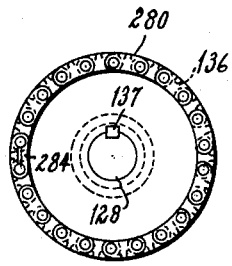
Fig. 20 is a view of a sprocket wheel and coupling chain, looking in the direction of arrow 20 of Fig. 19.
Figures 21, 22:
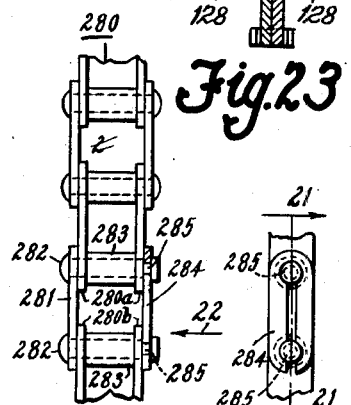
Fig. 21 is an enlargement of a sprocket coupling chain shown in Fig. 20, that part of Fig. 21 which is in section is on line 21—21 of Fig. 22.
Fig. 22 is a view in the direction of arrow 22 of Fig. 21 and shows a detachable link of the chain coupling.

Referring to Fig. 1, shaft 57 drives a gear 260 which meshes with a gear 261 connected with a shaft 262 supported by a bracket 263 fastened to rear frame 50. Shaft 262 drives a gear 264 meshing with a gear 265 which drives a shaft 266 also supported by the bracket 263. Shaft 266 drives a bevel gear 267 meshing with bevel gear 268 connected with a shaft 269 supported by bearings 270, 271 and 272 and driving a bevel gear 273 which meshes with a bevel gear 274 (Fig. 12) which drives a shaft 275. Shaft 275 is supported by a bracket 276 attached to a front frame 40 and drives a sprocket shaped like sprocket 130 (Fig. 19). Shaft 275 is in alignment with all of the shafts 128 of all of the magazine-transfer units 100. The shaft 275 is connected with the shaft 128 immediately to the right thereof; and each shaft 128 is connected with its neighbor in a similar manner. For example, the adjacent sprockets 130 are, in effect, two half sprockets which, when juxtaposed, form a complete sprocket adapted to receive a sprocket chain band 280 such as shown in Figs. 20 and 21. This band 280 is wrapped around the abutting half sprocket members and the ends 280a and 280b are joined by a detachable link 281 fixed to pins 282 passing through spacing sleeves 283 and retained by a resilient retainer 284, the arms of which can snap into grooves 285 provided by the pins 282. The shaft 275 and the shafts 128 of magazine units provide in effect one continuous shaft when they are coupled together by the sprocket chain bands which engage the half sprocket members. Removal of any one of the magazine-transfer units without disturbing any other unit can be effected with great facility since the shaft section 128 of the unit to be removed can easily be uncoupled from its neighboring shafts simply by uncoupling and removing the sprocket chain bands. By removing the screws which fasten the magazine-transfer unit to the conveyor frame and the bracket 167 at the front of the conveyor frame, the unit may be easily removed. Obviously the hose 239 will be removed and the transfer operating link 217 must be uncoupled from its operating mechanism.

The mechanism for reciprocating the links 217 will now be described. The rear side frame 50 of the conveyor supports a shaft 291, carrying a plurality of arms 292 each connected by a pin 293 with a link 217. The link 217 may include two end sections and an intermediate turn-buckle 217a by which the length of the link may be adjusted in order that the position of the transfer mechanism relative to the frame may be adjusted to the proper position in which the vacuum cups will be brought into proper relation to the magazine at one end of the oscillation of the lever 292 and with the conveyor workholders at the other end of the oscillation of the lever 292. The shaft 291 carries an arm 294 connected by a pin 295 with a link 296 connected with a crank pin 297 fastened to gear 264.

The control of the pawls 121 and 122 of each magazine unit can be effected by means other than a solenoid 150. Fig. 13 shows an alternative construction. To plates 109' and 110' corresponding to plates 109 and 110 of Fig. 19, there are secured plates 300 and 301 respectively which support a rod 302 secured by a set screw 303. Rod 302 pivotally supports a plate 304 having a notch 305 receiving a link 306 connected by pin 307 with the plate 304 and connected by pin 308 with the yoke plates 152. A spring 309 connecting plates 304 and 106 urges the plate 304 counterclockwise toward a latch lever 310 which engages a wear piece 311 attached to plate 304 by a screw 312. Lever 310 is pivoted on a rod 313 supported by plates 300 and 301. Plate 304 is connected by screw 314 and spacer 315 with a lever 316 attached to a hub 317 journaled on rod 302.

When the platform 112 reaches the upper level of its travel, a screw 318 attached to bracket 157 engages latch lever 310 to cause it to separate from wear piece 311 thereby permitting spring 309 to move the plate 304 and the lever 316 counterclockwise to effect left movement of link 306, yokes 152 and pawls 120 and 121 whereupon the platform 112 gravitates to the lowest level just as it did when solenoid 150 was energized. The operator moves a stack of parts from rollers 111 to rollers 113 and moves lever 316 clockwise to permit engagement of the pawls 120 and 121 with the ratchet bar 120 so that upward feeding of the platform 112 may be resumed. As the lever 316 is moved clockwise, the latch lever 310 gravitates into engagement with wear piece 311; and lever 316 will then be retained in pawl-to-ratchet engaging position.

Figure 14:
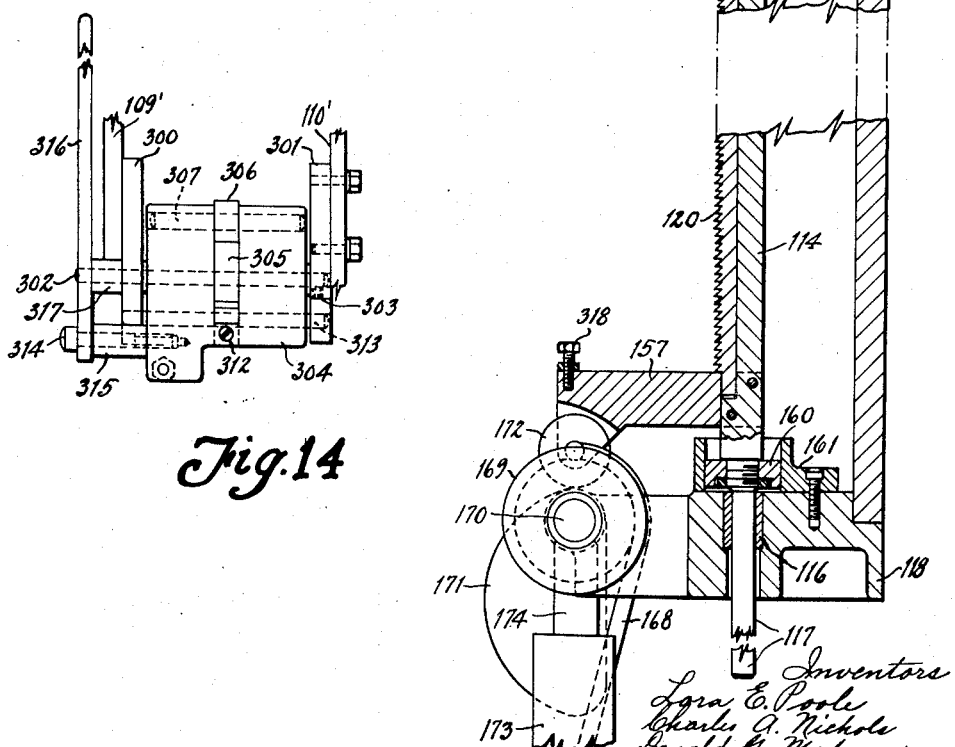
Fig. 14 is a view in the direction of arrow 14 of Fig. 13.

In the modification shown in Figs. 13 and 14, the return of the pawls to ratchet-engaging position is effected manually instead of automatically as in the form first disclosed. The omission of the feature of automatic pawl-reengagement is offset by simplification of construction and reduction of cost and also by saving in the space occupied by the solenoids, thereby making possible the location of a dust collector duct 320 under the rollers 111 upon which there are located the parts from which loose particles and dust may be removed by suction from the duct.

While the embodiments of the present invention as herein disclosed, constitute preferred forms, it is to be understood that other forms might be adopted, all coming within the scope of the claims which follow.

What is claimed is as follows:

1. A magazine for feeding flat parts to a transfer mechanism comprising a platform on which a stack of parts is placed, means for supporting the platform in a loading position, means for elevating the platform to a starting position, a step-by-step mechanism for moving the platform upwardly from starting position to a predetermined position of elevation, electrically operated means effective only when said platform attains said predetermined position of elevation for magnetically disconnecting the step-by-step mechanism so that the said mechanism is disassociated from the platform whereby the platform will gravitate quickly to loading position of the electrically operated means being rendered effective by a closure of a circuit controlled by the position of said step-by-step mechanism and means associated with the platform and including a dashpot for cushioning the descent of the platform upon the support only adjacent its lower limit of travel.

2. A magazine for feeding flat parts to a transfer mechanism comprising a platform on which a stack of parts is placed, means for supporting the platform in a loading position, means for elevating the platform to a starting position, a step-by-step mechanism for moving the platform upwardly from starting position to a predetermined position of elevation, means rendered effective by the closure of a circuit closed only when the platform attains said predetermined position of elevation for magnetically disconnecting the mechanism so that the platform will gravitate to loading position, a rod connected with the platform, a dashpot piston attached to the rod and a fixed dashpot cylinder for receiving the piston near the end of its downward movement only to cushion the descent of the platform upon the support.

3. A magazine for feeding flat parts to a transfer mechanism comprising a platform on which a stack of parts is placed, means for supporting the platform in a loading position, means for elevating the platform to a starting position, a vertically disposed ratchet bar connected with the platform, two independently operated pawls for engaging the ratchet, one a ratchet lifting pawl and the other a ratchet retaining pawl, two shafts each having an eccentric portion received by a hole in a pawl, means for connecting the shaft of the ratchet lifting pawl with a power source, means for fixing the other shaft in the desired position of angular adjustment to obtain the required spacing of the pawls, spring means for urging the pawls against the ratchet and electrically operated means including an actuator associated with each pawl for retracting both pawls simultaneously from the ratchet so that the platform will gravitate to the loading position.

4. A magazine for feeding flat parts to a transfer mechanism comprising a platform on which a stack of parts is placed, means for supporting the platform in a loading position, means for elevating the platform to a starting position, a vertically disposed ratchet bar connected with the platform, two independently operated pawls for engaging the ratchet, one a ratchet lifting pawl and the other a ratchet retaining pawl, a shaft having an eccentric portion received by a hole in the ratchet lifting pawl, means pivotally supporting the ratchet retaining pawl, springs urging the pawls against the ratchet, means for connecting the shaft with a power source, a yoke operatively connected to each pawl and means responsive to movement of the platform to a predetermined elevation for effecting movement of the yoke to cause simultaneous retraction of the pawls from the ratchet so that the platform will be free to gravitate to loading position.

5. A magazine for feeding flat parts to a transfer mechanism comprising a platform on which a stack of parts is placed, means for supporting the platform in a loading position, means for elevating the platform to a starting position, a vertically disposed ratchet bar connected with the platform, two independently operated pawls for engaging the ratchet, one a ratchet bar lifting pawl and the other a ratchet retaining pawl, a shaft having an eccentric portion received by a hole in the ratchet lifting pawl, means pivotally supporting the ratchet retaining pawl, springs urging the pawls against the ratchet, means for connecting the shaft with a power source, a yoke operatively connected with each of said pawls, means responsive to movement of the platform to a predetermined elevation for effecting movement of the yoke to cause simultaneous retraction of the pawls from the ratchet so that the platform will be free to gravitate to loading position, said last named means comprising a spring and a lever connected with the spring and the yoke, a retractable latch for holding the lever against the action of said last mentioned spring in a position to permit the functioning of the pawls, and means responsive to movement of the platform to a predetermined position for retracting the latch.

6. A magazine for feeding flat parts to a transfer mechanism comprising a platform on which a stack of parts is placed, means for supporting the platform in a loading position, means for elevating the platform to a starting position, a vertically disposed ratchet bar connected with the platform, two independently operated pawls for engaging the ratchet, one a ratchet lifting pawl and the other a ratchet retaining pawl, a shaft having an eccentric portion received by a hole in the ratchet lifting pawl, means pivotally supporting the ratchet retaining pawl, springs urging the pawls against the ratchet, means for connecting the shaft with a power source, a yoke operatively connected with each of said pawls, an electromagnet mechanically connected to said yoke for moving the yoke for causing simultaneous retraction of the pawls from the ratchet so that the platform will be free to gravitate to loading position, a switch in circuit with the electromagnet and a current source and means responsive to the attainment of a predetermined elevation of the platform for causing the switch to cause energization of the electromagnet.

7. A magazine unit for feeding flat parts to a transfer mechanism comprising parallel, vertical side members and a vertical back member connecting the side members thereby providing a vertically extending channel for guiding a stack of parts, one of said members being utilized to attach the unit to a parts assembling machine having a plurality of juxtaposed linearly arranged similar magazine units, a platform movable in the channel, a step-by-step mechanism for elevating the platform and having a horizontal operating shaft supported by the side members, and means for connecting the ends of said shaft with the shafts of other magazine units in alignment therewith, said means each comprising a sprocket attached to the shaft and juxtaposed to a like sprocket of the adjacent magazine unit when assembled with the machine and a chain band for associating said juxtaposed sprockets into a unit and having disconnectible links whereby the mechanism shaft of any single unit can be disconnected from the shafts of other units to permit removal of the unit from the parts assembling machine while all other units remain assembled therewith.

CHARLES A. NICHOLS.
LORA E. POOLE.
DONALD G. MAHONEY.
MARSHALL D. McSHURLEY.

References Cited in the file of this patent

UNITED STATES PATENTS

| Number | Name | Date |
| --- | --- | --- |
| 952,097 | Brown | Mar. 15, 1910 |
| 1,366,549 | Winkley | Jan. 25, 1921 |
| 1,946,988 | Schueler | Feb. 13, 1934 |
| 2,093,992 | Braam | Sept. 28, 1937 |
| 2,137,381 | Blackstone | Nov. 22, 1938 |
| 2,172,519 | Reeder | Sept. 12, 1939 |
| 2,214,960 | Harding | Sept. 17, 1940 |
| 2,234,094 | Sprinkle | Mar. 4, 1941 |